United States Patent
Yoshida et al.

(10) Patent No.: US 6,825,254 B2
(45) Date of Patent: Nov. 30, 2004

(54) POLYPHENYLENE ETHER RESIN COMPOSITION

(75) Inventors: Kazuo Yoshida, Sodegaura (JP); Yuji Tada, Tokushima (JP)

(73) Assignees: Asahi Kasei Chemicals Corporation, Tokyo (JP); Otsuka Chemical Co., Ltd., Osaka (JP)

(*) Notice: Subject to any disclaimer, the term of this patent is extended or adjusted under 35 U.S.C. 154(b) by 113 days.

(21) Appl. No.: 10/343,947

(22) PCT Filed: Sep. 3, 2001

(86) PCT No.: PCT/JP01/07610

§ 371 (c)(1),
(2), (4) Date: Feb. 5, 2003

(87) PCT Pub. No.: WO02/20664

PCT Pub. Date: Mar. 14, 2002

(65) Prior Publication Data

US 2003/0176600 A1 Sep. 18, 2003

(30) Foreign Application Priority Data

Sep. 4, 2000 (JP) ........................................ 2000-267273

(51) Int. Cl.$^7$ ............................................. C08K 5/5399
(52) U.S. Cl. ........................................ 524/116; 524/138
(58) Field of Search .................................. 524/116, 138

(56) References Cited

U.S. PATENT DOCUMENTS

2003/0040643 A1 * 2/2003 Nakano et al. ................ 564/16

FOREIGN PATENT DOCUMENTS

| JP | 52-153987 | 12/1977 |
| JP | 60-58461 A | 4/1985 |
| JP | 61-275332 A | 12/1986 |
| JP | 3-73590 B2 | 11/1991 |
| JP | 9-71708 A | 3/1997 |
| JP | 9-183864 A | 7/1997 |
| JP | 11-181429 A | 7/1999 |
| JP | 2000-198793 A | 7/2000 |
| WO | WO 99/19383 A1 | 4/1999 |
| WO | WO 00/09518 A1 | 2/2000 |

* cited by examiner

*Primary Examiner*—Peter Szekely
(74) *Attorney, Agent, or Firm*—Birch, Stewart, Kolasch & Birch, LLP

(57) ABSTRACT

The resin composition of the present invention comprises (A) a resin composition comprising a polyphenylene ether resin or a polyphenylene ether resin and a polystyrene resin and (B) a phosphazene compound having an acid value of less than 0.5. This resin composition contains no halogen compounds and hence is environmentally preferred, and furthermore is excellent in electrical characteristics, heat resistance and mechanical properties, causes substantially no problems such as smoking during injection molding and desposition of flame-retardants on the mold, and has high flame retardancy.

5 Claims, No Drawings

POLYPHENYLENE ETHER RESIN COMPOSITION

This application is the national phase under 35 U.S.C. § 371 of PCT International Application No. PCT/JP01/07610 which has an International filing date of Sep. 3, 2001, which designated the United States of America.

TECHNICAL FIELD

The present invention relates to a resin composition excellent in flame retardancy and preferred for environmental protection.

BACKGROUND ART

For flame-retardation of flammable synthetic resins, there have been generally employed flame-retardation methods such as addition of halogen-containing compounds and antimony trioxide, etc. However, these conventional flame-retardation methods are not desirable for environmental health and there is a demand to improve them in this respect.

On the other hand, for flame-retardation of polyphenylene ether resins or mixed resins thereof with styrene resins or polycarbonate resins or mixed resins thereof with styrene resins, halogen-containing compounds have not been used and there have been used organic phosphoric acid esters, for example, monophosphoric acid esters such as triphenyl phosphate, cresyl diphenyl phosphate and tricresyl phosphate, condensed phosphoric acid esters of resorcinol or bisphenol A, a phenol compound and phosphoric acid, etc. However, these resin compositions have problems such as deterioration in heat resistance and physical properties, water absorption at high temperature and high humidity, occurrence of smoke during injection molding, and deposition of flame-retardants onto the mold. Among them, condensed phosphoric acid esters obtained from resorcinol, 2,6-dimethylphenol and phosphoric acid are considered to be less problematic.

Furthermore, as for the flame-retardation of polyphenylene ether resins or mixed resins thereof with styrene resins, resin compositions containing phosphazene compounds such as phenoxyphosphazene as flame-retardants are disclosed in JP-B-3-73590, JP-A-9-71708, JP-A-9-183864, JP-A-11-181429 and WO 00/09518. However, even though these resin compositions are larger in phosphorus content as compared with the above resin compositions containing organic phosphoric acid ester flame-retardants, the former resin compositions are insufficient in flame retardancy and sometimes cause deterioration of electrical characteristics inherent to resins and formation of deposits onto the mold during molding, and thus they are not considered to be effective flame-retardants.

DISCLOSURE OF INVENTION

An object of the present invention is to provide a resin composition which contains no halogen-containing compounds, is excellent in heat resistance, mechanical characteristics and electrical characteristics, has substantially no problems such as occurrence of smoke during injection molding and deposition of flame-retardants on the mold, is preferred for environmental health, and has high flame retardancy.

As a result of intensive research conducted by the present inventors in an attempt to attain the above object, it has been found that the above object can be attained by using a resin composition containing a resin composition comprising a polyphenylene ether resin or a polyphenylene ether resin and a polystyrene resin and a specific phosphazene compound. Thus, the present invention has been accomplished.

That is, the present invention relates to the following inventions.

[1] A resin composition containing (A) a resin composition comprising a polyphenylene ether resin or a polyphenylene ether resin and a polystyrene resin and (B) a phosphazene compound having an acid value of less than 0.5.

[2] A resin composition as mentioned in the above [1], wherein the acid value of the phosphazene compound is less than 0.3.

[3] A resin composition as mentioned in the above [1] or [2], wherein the phosphazene compound is a phenoxyphosphazene compound.

[4] A resin composition as mentioned in the above [1] or [2], wherein the phosphazene compound has a cyclic structure.

[5] A resin composition as mentioned in the above [1] or [2], wherein the phosphazene compound is a phenoxyphosphazene compound having a crosslinked structure.

BEST MODE FOR CARRYING OUT THE INVENTION

The present invention will be specifically explained below.

As the polyphenylene ether resins used in the present invention, there are used homopolymers or copolymers having the repeating units represented by the following general formulas (I) and/or (II):

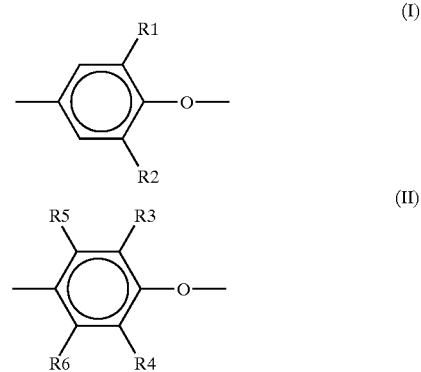

(where R1, R2, R3, R4, R5 and R6 each independently represent an alkyl group of 1–4 carbon atoms, an aryl group, halogen or hydrogen, with a proviso that R5 and R6 do not simultaneously represent hydrogen).

Representative examples of homopolymers of the polyphenylene ether resins are poly(2,6-dimethyl-1,4-phenylene) ether, poly(2-methyl-6-ethyl-1,4-phenylene) ether, poly(2,6-diethyl-1,4-phenylene) ether, poly(2-ethyl-6-n-propyl-1,4-phenylene) ether, poly(2,6-di-n-propyl-1,4-phenylene) ether, poly(2-methyl-6-n-butyl-1,4-phenylene) ether, poly(2-ethyl-6-isopropyl-1,4-phenylene) ether, poly(2-methyl-6-chloroethyl-1,4-phenylene) ether, poly(2-methyl-6-hydroxyethyl-1,4-phenylene) ether, poly(2-methyl-6-chloroethyl-1,4-phenylene) ether, etc.

Of these homopolymers, poly(2,6-dimethyl-1,4-phenylene) ether is preferred. Especially preferred are polyphenylene ethers having as a partial structure a 2-(dialkylaminomethyl)-6-methylphenylene ether unit, a 2-(N-alkyl-N-phenylaminomethyl)-6-methylphenylene ether unit, or the like as disclosed in JP-A-63-301222.

The polyphenylene ether copolymers should be understood here to mean copolymers having a phenylene ether structure as a main monomer unit. Examples of them are a copolymer of 2,6-dimethylphenol and 2,3,6-trimethylphenol, copolymer of 2,6-dimethylphenol and o-cresol, copolymer of 2,6-dimethylphenol, 2,3,6-trimethylphenol and o-cresol, etc.

In the present invention, a part or all of the polyphenylene ether resins can be modified polyphenylene ether resins modified with an unsaturated carboxylic acid or a derivative thereof. These modified polyphenylene ether resins are disclosed in JP-A-2-276823, JP-A-63-108059 and JP-A-59-59724, and they are produced, for example, by melt kneading a polyphenylene ether resin with an unsaturated carboxylic acid or a derivative thereof to react them in the presence or absence of a radical initiator. Alternatively, they are produced by dissolving polyphenylene ether and an unsaturated carboxylic acid or a derivative thereof in an organic solvent in the presence or absence of a radical initiator and reacting them in a solution.

Examples of the unsaturated carboxylic acids or derivatives thereof include maleic acid, fumaric acid, itaconic acid, halogenated maleic acid, cis-4-cyclohexene-1,2-dicarboxylic acid, endo-cis-bicyclo(2,2,1)-5-heptene-2,3-dicarboxylic acid, and anhydrides, esters, amides, imides, etc. of these dicarboxylic acids, and, furthermore, acrylic acid, methacrylic acid and esters, amides, etc. of these monocarboxylic acids. Moreover, there may also be used compounds which are saturated carboxylic acids, but are per se heat decomposed at the reaction temperature in production of the modified polyphenylene ether and can become the derivatives usable in the present invention. Examples of the compounds are malic acid, citric acid, etc. These may be used each alone or in combination of two or more.

Next, the styrene resins used in the present invention are polymers obtained by polymerizing a styrene compound or a styrene compound and a compound copolymerizable with a styrene compound in the presence or absence of a rubber-like polymer.

Examples of the styrene compounds include styrene, β-methylstyrene, 2,4-dimethylstyrene, monochlorostyrene, p-methylstyrene, p-tert-butyl-styrene, ethylstyrene, etc. Styrene is most preferred. Examples of the compounds copolymerizable with the styrene compounds include methacrylic acid esters such as methyl methacrylate and ethyl methacrylate; unsaturated nitrile compounds such as acrylonitrile and methacrylonitrile; acid anhydrides such as maleic anhydride; etc. The amount of the copolymerizable compounds is preferably not more than 20% by weight, more preferably not more than 15% by weight based on the total amount of the copolymerizable compound and the styrene compound.

The rubber-like polymers include, for example, conjugated diene rubbers, copolymers of conjugated diene and aromatic vinyl compound, ethylene-propylene copolymer rubbers, etc. Specifically, polybutadiene and styrene-butadiene copolymer are especially preferred. In the case of using unsaturated rubber-like polymers, it is preferred to use partially hydrogenated rubbers.

Examples of the styrene resins include polystyrene and rubber-reinforced polystyrene, styrene-acrylonitrile copolymer (AS resin) and rubber-reinforced styrene-acrylonitrile copolymer (ABS resin), and other styrene copolymers. Polystyrene and rubber-modified polystyrene are particularly preferred.

The phosphazene compounds used in the present invention are those which have a cyclic or straight chain structure represented by the following general formula (III):

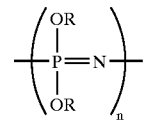

(III)

(where R's each independently represent an aliphatic or aromatic group of 1–20 carbon atoms, and n is an integer of 3 or more). Those which have a cyclic structure are preferred. It is especially preferred to use phenoxyphosphazene compounds having a six-membered ring where n=3, phenoxyphosphazene compounds having an eight-membered ring where n=4, and mixtures thereof.

Furthermore, these compounds may be cross-linked with a crosslinking group selected from the group consisting of a phenylene group, biphenylene group and a group represented by the following formula:

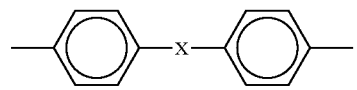

(where X represents —C(CH$_3$)$_2$-, —SO$_2$-, —S— or —O—) by the method disclosed in JP-A-11-181429 or WO 00/09518. These phosphazene compounds having a crosslinked structure (crosslinked phosphazene compounds) are produced specifically by reacting a dichlorophosphazene oligomer with an alkali metal salt of phenol and an alkali metal salt of an aromatic dihydroxy compound. These alkali metal salts are added to the dichlorophosphazene oligomer slightly in excess of the stoichiometric amount.

The phosphazene compounds represented by the formula (III) are known compounds and are disclosed, for example, in James E. Mark, Harry R. Allcock, Robert West, "Inorganic Polymers", Pretice-Hall International, Inc., 1992, p61–p140.

As reference literatures which disclose examples of preparation of these phosphazene compounds, mention may be made of JP-B-3-73590, JP-A-9-71708, JP-A-9-183864, JP-A-11-181429, and WO 00/09518.

It is essential that the phosphazene compounds used in the present invention have an acid value of less than 0.5, and the acid value is preferably less than 0.3, more preferably less than 0.15. The acid value is used here to mean a value shown by the mg of potassium hydroxide required for neutralizing the acidic component contained in 1 g of a sample, which is in accordance with JIS K2501. The acid value can be controlled by repeatedly washing and purifying the prepared crude phosphazene compound. Specifically, the crude phosphazene compound is purified by repeated washing and dehydration with a dilute aqueous acid or alkali solution and additionally washing and dehydration with a mixed liquid of water and methanol. By increasing the number of times of washing, a phosphazene compound of smaller acid value can be obtained. Furthermore, the acid value can be efficiently reduced by purifying the prepared phosphazene compound by allowing the phosphazene compound to contact with one or more adsorbents selected from the group consisting of activated carbon, silica gel, activated alumina, activated clay, molecular sieves and polymer-type adsorbents. The phosphazene compound subjected to the adsorbent treatment is superior in quality to the phosphazene compound subjected to washing with a neutral, acidic or alkaline aqueous solution. When the phosphazene compound subjected to the adsorbent treatment is used, the flame retardancy and electrical characteristics of the resin compositions are improved, and problems such as decomposition of resin when processed at high temperatures, occurrence of smoke during injection molding and deposition onto molds can be mostly solved.

In the present invention, for the treatment of a phosphazene compound with adsorbent, any methods can be employed as long as the adsorbent and the phosphazene compound can contact with each other. For example, the adsorbent and the phosphazene compound may be mixed in the same tank (batch type) or the adsorbent may be packed in a column so as to pass the phosphazene compound through the column. In the case of the batch method, the amount of the adsorbent used is not particularly limited, and can be selected from a wide range depending on various conditions such as the kind and amount of the phosphazene compound and the kind of adsorbent, etc. and the amount is usually 1–30 parts by weight, preferably 2–25 parts by weight based on 100 parts by weight of the phosphazene compound. If the amount of the adsorbent is less than 1 part by weight, the effect of reduction of acid value may be insufficient, and if it excessively exceeds 30 parts by weight, not only the impurities, but also the phosphazene compound are adsorbed, which may result in reduction of the yield. On the other hand, when the treatment is carried out by packing the adsorbent in a column, the amount of the adsorbent used is not limited. The column is prepared with a packing material in such an amount that problems are not caused in operation of the column. A column may be used continuously and when the adsorbability lowers, the packing material may be changed or regenerated.

The contact of the phosphazene compound with the adsorbent may be carried out where the phosphazene compound is molten with heating, or a solvent may be used. The concentration of the phosphazene compound in the case of using a solvent has no particular limitation, but is preferably 1–90% from the point of ease in operation. The reaction temperature in the case of using a solvent has no particular limitation as long as the phosphazene compound dissolves at that temperature, but it is preferred that the reaction temperature is generally in the range of 0° C. to the boiling point of the solvent used. On the other hand, in the case of the phosphazene compound being molten with heating, the reaction temperature is preferably about 200° C. or lower. Furthermore, the reaction time has no special limitation because no adverse effect is caused even if the phosphazene compound contacts with the adsorbent for a long time, but is preferably 5 minutes to 12 hours.

The solvents used here may be any solvents as long as they can dissolve the phosphazene compound and do not hinder the action of the adsorbent. For example, mention may be made of organic solvents, e.g., aromatic hydrocarbons such as benzene, toluene and xylene, halogenated aromatic hydrocarbons such as monochlorobenzene and dichlorobenzene, ketones such as acetone, methyl ethyl ketone and methyl isobutyl ketone, alcohols such as methanol, ethanol, n-propanol, isopropanol, n-butanol and tert-butanol, esters such as methyl formate, ethyl formate, propyl formate, butyl formate, methyl acetate, ethyl acetate, propyl acetate and butyl acetate, ethers such as diethyl ether, diisopropyl ether, dibutyl ether, tetrahydrofuran, dioxane and trioxane, nitrogen-containing hydrocarbons such as acetonitrile, benzonitrile and pyridine, etc. These solvents may be used each alone or in admixture of two or more.

In the present invention, the phosphazene compound is preferably a phenoxyphosphazene compound, especially preferably a phenoxyphosphazene compound having a crosslinked structure.

In the present invention, if the acid value of the phosphazene compound is 0.5 or more, the flame retardancy of the resin composition is low, and the phosphazene compound is inferior to organic phosphoric acid ester flame-retardants with respect to physical properties of the resin composition. The resin composition containing the phosphazene compound having an acid value of less than 0.5 is excellent not only in flame retardancy, but also in electrical characteristics such as relative dielectric constant and dielectric loss tangent. Moreover, a phosphazene compound having an acid value of 0.5 or more may damage the properties inherent to the resin due to hydrolysis or the like in reuse of the resin, placing restrictions on reuse. Higher hydrolyzability suggests that when the resin is discarded, it may dissolve into water or soil, and this causes environmental problems.

In the present invention, as for the mixing ratio of (B) the phosphazene compound to (A) the resin composition comprising a polyphenylene ether resin or a polyphenylene ether resin and a polystyrene resin, a ratio which provides the desired flame retardancy may be optionally selected, but it is restricted by fluidity during the molding process, heat resistance, mechanical characteristics or economical efficiency of the composition. The amount of the phosphazene compound (B) is preferably in the range of 1–30 parts by weight based on 100 parts by weight of the resin composition (A) comprising a polyphenylene ether resin or a polyphenylene ether resin and a polystyrene resin.

A composite of high strength excellent in fluidity and heat resistance can be obtained by further adding inorganic fillers such as glass fibers, glass flakes, kaolin clay and talc or other fibrous reinforcing materials to the resin composition of the present invention. Furthermore, as impact resistance imparting agents, there may be suitably used thermoplastic elastomers, e.g., rubber-like polymers such as styrene-butadiene block copolymer, styrene-isoprene block copolymer and hydrogenation products thereof.

In order to impart other characteristics, there may be further added to the resin composition of the present invention, in a range that does not damage the effects of the present invention, other additives, e.g., plasticizers, stabilizers such as antioxidants and ultraviolet absorbers, antistatic agents, releasing agents, dyes and pigments or other resins. Moreover, the flame retardancy can further be improved by adding known various flame-retardants or flame retarding aids such as alkali metal hydroxides or alkaline earth metal hydroxides such as magnesium hydroxide and aluminum hydroxide containing water of crystallization, zinc borate compounds, zinc stannate compounds, and inorganic silicon compounds such as silica, kaolin clay and talc to the resin composition.

The method for producing the resin composition of the present invention is not particularly limited, and the composition can be produced by kneading with kneading machines such as extruders, heating rolls, kneaders and Banbury mixers. Among them, kneading by extruders is preferred from the point of productivity. The kneading temperature can depend on the preferred processing temperature of the base resin, and is in the range of 200–360° C., preferably 240–320° C. as a standard.

EXAMPLE

The present invention will be explained by the following examples, with preparation examples and reference examples of the phosphazene compounds. The present invention shall not be limited to these examples.

The components used in the examples and the comparative examples are as follows.

(A-1) Polyphenylene ether (PPE)

PPE: Unmodified poly-2,6-dimethyl-1,4-phenylene ether having a η sp/c of 0.54 measured in a chloroform solution at 30° C.

(A-2) Rubber-reinforced polystyrene (HIPS)

HIPS: A rubber-reinforced polystyrene having a rubber content of 9%, a η sp/c of matrix polystyrene of 0.64 measured in a toluene solution at 30° C., and a volumetric average rubber particle diameter of 1.5 μm.

(B) Phenoxyphosphazene compound

Preparation Example 1-1: Preparation of Phenoxyphosphazene Compound 113.0 Grams (1.2 moles) of phenol was charged in a four-necked flask of 1 liter equipped with a stirrer, a thermometer and a reflux condenser, and 400 mL of tetrahydrofuran (THF) was added thereto to carry out uniform dissolution. Then, 26.4 g of metallic sodium was added thereto at 25° C. or lower, and after completion of the addition, the temperature was raised to 63° C. over a period of 1 hour, followed by continuation of stirring at 63–68° C. for 6 hours to prepare a sodium phenolate solution.

In parallel with the above reaction, 58.0 g (0.5 unit mole) of a mixture of hexachlorocyclo-triphosphazene and octachlorocyclotetraphosphazene (hexachlorocyclotriphosphazene (trimer); 62%, octachlorocyclotetraphosphazene (tetramer); 38%) was dissolved in 250 mL of THF in a 2L four-necked flask, and to the resulting solution while stirring at 25° C. or lower was added dropwise the sodium phenolate solution prepared above. After completion of the addition, reaction was carried out with stirring at 71–73° C. for 12 hours. After completion of the reaction, the reaction mixture was concentrated and re-dissolved in 500 mL of toluene, followed by carrying out water washing, washing with a 5% aqueous sodium hydroxide solution, washing with a 5% aqueous hydrochloric acid solution, washing with a 5% aqueous sodium bicarbonate solution, and water washing. To this toluene solution was added 5 g of silica gel (tradename: WAKO GEL C-200 manufactured by Wako Pure Chemical Industries, Ltd.), followed by stirring at room temperature for 1 hour. After the silica gel was filtered off, the organic layer was concentrated under reduced pressure. The resulting product was vacuum dried with heating at 80° C. for 11 hours under 4 hPa or lower to obtain 104 g of a white solid.

The resulting phenoxyphosphazene compound had an acid value of 0.01 mg KOH/g and contained hydrolyzable chlorine of 0.03% or less. The melting point (Tm) according to TG/DTA analysis was 108° C., the decomposition starting temperature was 323° C., and the 5% weight loss temperature was 335° C.

Preparation Example 1-2: Preparation of Phenoxyphosphazene Compound

A phenoxyphosphazene compound was prepared in the same manner as in Preparation Example 1-1, except that the amount of the silica gel used for the post-treatment after completion of the reaction was 1 g. The resulting phenoxyphosphazene compound had an acid value of 0.3 mg KOH/g.

Reference Example 1: Preparation of Phenoxyphosphazene Compound

A phenoxyphosphazene compound was prepared in the same manner as in Preparation Example 1-1, except that the treatment with silica gel was not carried out in the post-treatment after completion of the reaction, thereby obtaining 109 g of a slightly yellow solid. The resulting phenoxyphosphazene compound had an acid value of 0.77 mg KOH/g and contained hydrolyzable chlorine of 0.08%. The melting point (Tm) according to TG/DTA analysis was 106° C., the decomposition starting temperature was 321° C., and the 5% weight loss temperature was 333° C.

Preparation Example 2: Preparation of Phenoxyphosphazene Compound Having Crosslinked Structure Given by 2,2-bis(p-oxyphenyl)isopropylidene Group 56.5 Grams (0.6 mole) of phenol and 500 mL of toluene were charged in a 1 L four-necked flask, and 0.55 gram atom (12.6 g) of metallic sodium chips were added thereto under stirring while keeping the inner liquid temperature at 25° C., followed by stirring at 90–113° C. for 8 hours until the metallic sodium completely disappeared, thereby to prepare a sodium phenolate solution.

In parallel with the above reaction, 57.1 g (0.25 mole) of bisphenol A, 103.5 g (1.1 mole) of phenol and 700 mL of THF were charged in a 3 L four-necked flask, and 1.6 gram atom (11.1 g) of metallic lithium chips were added thereto under stirring while keeping the inner liquid temperature at 25° C., followed by stirring at 63–68° C. for 8 hours until the metallic lithium completely disappeared. To this slurry solution was added dropwise 1.0 mole (115.9 g) of dichlorophosphazene oligomer (concentration: 37%; chlorobenzene solution: 313 g; composition: a mixture of 70% of trimer, 19% of tetramer, 8% of pentamer and hexamer, 2% of heptamer, and 1% of octamer or higher polymers) under stirring while keeping the inner liquid temperature at 20° C. or lower, followed by carrying out the reaction at 80° C. for 2 hours. Then, the separately prepared sodium phenolate solution was added under stirring while keeping the inner liquid temperature at 20° C., followed by carrying out the reaction at 80° C. for 5 hours.

After completion of the reaction, the reaction mixture was concentrated to remove THF, and 1 L of toluene was further added. The resulting toluene solution was washed thrice with 1 L of 2% NaOH, and then washed thrice with 1L of water. Thereafter the solution was passed at room temperature through a column made using 20 g of activated alumina (manufactured by Wako Pure Chemical Industries, Ltd.). The resulting organic layer was concentrated under reduced pressure. The resulting product was vacuum dried with heating at 80° C. for 11 hours under 4 hPa or lower to obtain 228 g of a white powder.

The resulting crosslinked phenoxyphosphazene compound had an acid value of 0.02 mg KOH/g and contained hydrolyzable chlorine of 0.03%. From phosphorus content and CHN elemental analytical values, the composition of the final product was determined to be $[N=P(-O-C_6H_4-C(CH_3)_2-C_6H_4-O-)_{0.25}(-O-C_6H_5)_{1.5}]$. The weight-average molecular weight (Mw) in terms of polystyrene (according to GPC analysis) was 1,140, a clear melting point was not shown by TG/DTA analysis, the decomposition starting temperature was 311° C., and the 5% weight loss temperature was 322° C. Furthermore, as a result of carrying out the determination of residual hydroxyl group by an acetylation method, it was less than the limit of detection (less than $1 \times 10^{-6}$ equivalent/g as hydroxyl equivalent per 1 g of sample).

Reference Example 2: Preparation of a Phenoxyphosphazene Compound Having Crosslinked Structure Given by 2,2-bis(p-oxyphenyl)isopropylidene Group A crosslinked phenoxyphosphazene compound was prepared in the same manner as in Preparation Example 2, except that the column treatment with activated alumina was not carried out in the post-treatment after the reaction, and as a result, 229 g of a white powder was obtained. The resulting crosslinked phenoxyphosphazene compound had an acid value of 0.55 mg KOH/g and contained hydrolyzable chlorine of 0.08%. From phosphorus content and CHN elemental analytical values, the composition of the final product was determined to be $[N=P(-O-C_6H_4-C(CH_3)_2-C_6H_4-O-)_{0.25}(-O-C_6H_5)_{1.50}]$. The weight-average molecular weight (Mw) in terms of polystyrene (according to GPC analysis) was 1,100, a clear melting point was not shown by TG/DTA analysis, the decomposition starting temperature was 306° C., and the 5% weight loss temperature was 312° C. Furthermore, as a result of carrying out the determination of residual hydroxyl group by an acetylation method, it was less than the limit of detection (less than $1 \times 10^{-6}$ equivalent /g as hydroxyl equivalent per 1 g of sample).

Preparation Example 3: Preparation of a Phenoxyphosphazene Compound Having Crosslinked Structure Given by 4,4-sulfonyldiphenylene (Bisphenol-S Residue)

32.9 Grams (0.35 mole) of phenol and 400 mL of THF were charged in a 1 L four-necked flask, and 0.30 gram atom (6.9 g) of metallic sodium chips were added thereto under stirring while keeping the inner liquid temperature at 25° C., followed by stirring at 65–72° C. for 5 hours until the metallic sodium completely disappeared, thereby to prepare a sodium phenolate solution.

In parallel with the above reaction, 160.0 g (1.70 mole) of phenol and 12.5 g (0.05 mole) of bisphenol-S were dissolved in 500 mL of THF in a 1 L four-necked flask, and 1.8 gram atom (41.4 g) of metallic sodium was introduced thereinto at 25° C. or lower. After completion of the introduction, the temperature was raised to 63° C. over a period of 1 hour, followed by continuation of stirring at 63–68° C. for 6 hours to prepare a sodium phenolate mixed solution. This solution was added dropwise to 580 g of a 20% chlorobenzene solution containing 1.0 unit mole (115.9 g) of a dichlorophosphazene oligomer (concentration: 37%; chlorobenzene solution: 313 g; composition: a mixture of 70% of trimer, 19% of tetramer, 8% of pentamer and hexamer, 2% of heptamer, and 1% of octamer or higher polymers) while keeping the inner liquid temperature at 25° C. or lower, followed by carrying out the reaction with stirring at 71–73° C. for 5 hours. Then, the sodium phenolate mixed solution prepared above was added dropwise, followed by continuing the reaction at 71–73° C. for 5 hours.

After completion of the reaction, the reaction mixture was concentrated and re-dissolved in 500 mL of chlorobenzene and was washed thrice with a 5% aqueous NaOH solution, washed with 5% sulfuric acid, washed with a 5% aqueous sodium bicarbonate solution and washed thrice with water. Then, 5 g of active carbon (CARBORAFIN manufactured by Takeda Chemical Industries, Ltd.) was added thereto, followed by stirring at room temperature for 1 hour. The active carbon was filtered off, followed by concentrating to dryness to obtain 217 g of a white powder.

The resulting crosslinked phenoxyphosphazene compound had an acid value of 0.01 mg KOH/g and contained hydrolyzable chlorine of 0.01% or less. From phosphorus content and CHN elemental analytical values, the composition of the compound was determined to be nearly $[N=P(-O-C_6H_4-SO_2-C_6H_4-O-)_{0.05}(-O-C_6H_5)_{1.90}]$. The weight-average molecular weight (Mw) in terms of polystyrene (according to GPC analysis) was 1,080, the melting point (Tm) according to TG/DTA analysis was 105° C., the decomposition starting temperature was 323° C., and the 5% weight loss temperature was 337° C. Furthermore, as a result of carrying out the determination of residual hydroxyl group by an acetylation method, it was less than the limit of detection (less than $1 \times 10^{-6}$ equivalent/g as hydroxyl equivalent per 1 g of sample).

Reference Example 3: Preparation of a Phenoxyphosphazene Compound Having Crosslinked Structure Given by 4,4-sulfonyldiphenylene (Bisphenol-S Residue)

A crosslinked phenoxyphosphazene compound was prepared in the same manner as in Preparation Example 3, except that the treatment with active carbon was not carried out in the post-treatment after the reaction, and, as a result, 219 g of a citrine solid was obtained. The resulting crosslinked phenoxyphosphazene compound had an acid value of 0.56 mg KOH/g and contained hydrolyzable chlorine of 0.03% or less. From phosphorus content and CHN elemental analytical values, the composition of the product was determined to be nearly $[N=P(-O-C_6H_4-SO_2-C_6H_4-O-)_{0.05}(-O-C_6H_5)_{1.90}]$. The weight-average molecular weight (Mw) in terms of polystyrene (according to GPC analysis) was 1,060, the melting point (Tm) according to the TG/DTA analysis was 103° C., the decomposition starting temperature was 318° C., and the 5% weight loss temperature was 331° C. Furthermore, as a result of carrying out the determination of residual hydroxyl group by an acetylation method, it was less than the limit of detection (less than $1 \times 10^{-6}$ equivalent/g as hydroxyl equivalent per 1 g of sample)

Preparation Example 4: Preparation of Phenoxyphosphazene Compound Having a Crosslinked Structure Given by p-phenylene A mixture of 94.11 g (1.0 mole) of phenol, 40.0 g (1.0 mole) of sodium hydroxide, 50 g of water and 500 mL of toluene was refluxed under heating to remove only water out of the system, thereby to prepare a toluene solution of sodium phenolate.

In parallel with the above reaction, a mixture of 16.5 g (0.15 mole) of hydroquinone, 94.1 g (1.0 mole) of phenol, 31.1 g (1.3 mole) of lithium hydroxide, 52 g of water and 600 mL of toluene was charged in a 2L four-necked flask and refluxed under heating to remove only water out of the system, thereby to prepare a toluene solution wherein lithium salt of phenol and that of hydroquinone are dissolved. To this toluene solution was added dropwise 580 g of a 20% chlorobenzene solution containing 1.0 unit mole (115.9 g) of a dichlorophosphazene oligomer (concentration: 37%; chlorobenzene solution: 313 g; composition: a mixture of 70% of trimer, 19% of tetramer, 8% of pentamer and hexamer, 2% of heptamer, and 1% of octamer or higher polymers) at 30° C. or lower, followed by carrying out the reaction with stirring at 110° C. for 5 hours. Then, the toluene solution of sodium phenolate prepared above was added, followed by continuing the reaction at 110° C. for 5 hours.

After completion of the reaction, the reaction mixture was washed thrice with 1.0 L of a 3% aqueous sodium hydroxide solution, then washed with 1.0 L of water thrice. After vacuum distilling off toluene, the reaction mixture was vacuum dried with heating at 120° C. for 11 hours under 4 hPa or lower. To the resulting melt containing no solvent was added 5 g of activated clay (tradename: GAREONEARTH V2 manufactured by Mizusawa Industrial Chemicals, Ltd.), followed by stirring at 120° C. for 1 hour. After the activated clay was filtered off with heating, the melt was cooled to obtain 209 g of a white powder.

The resulting crosslinked phenoxyphosphazene compound had an acid value of 0.01 mg KOH/g and contained hydrolyzable chlorine of 0.02%. From phosphorus content and CHN elemental analytical values, the composition of the final product was determined to be $[N=P(\!\!-\!\!O\!\!-\!\!p\!\!-\!\!C_6H_4\!\!-\!\!O\!\!-\!\!)_{0.15}(\!\!-\!\!O\!\!-\!\!C_6H_5)_{1.70}]$. The weight-average molecular weight (Mw) in terms of polystyrene (according to GPC analysis) was 1,090, no clear melting point was shown according to TG/DTA analysis, the decomposition starting temperature was 309° C., and the 5% weight loss temperature was 312° C. Furthermore, as a result of carrying out the determination of residual hydroxyl group by an acetylation method, it was less than the limit of detection (less than $1 \times 10^{-6}$ equivalent/g as hydroxyl equivalent per 1 g of sample).

The phosphoric acid ester flame-retardants used in the comparative examples are as follows.

TPP: Triphenyl phosphate having an acid value of 0.03 mg KOH/g (TPP manufactured by Daihachi Chemical Industry Co., Ltd.).

BPA-DPP: A phosphoric acid ester compound mainly composed of bisphenol A-bis(diphenyl phosphate) having an acid value of 0.6 mg KOH/g (CR-741 manufactured by Daihachi Chemical Industry Co., Ltd.).

Evaluation of physical properties of the resin compositions of the examples and the comparative examples was conducted by the following methods and under the following conditions.

(1) Flame retardancy:

This was measured according to UL-94 vertical flame test, using a test piece of 1/16 inch in thickness made by injection molding, and evaluation was conducted on total burning time when the test piece was allowed to contact with a flame 10 times and on whether dropping of materials occurred or not during burning.

(2) Electrical characteristics:

A molded test piece of 150×150 mm with a thickness of about 2 mm was left to stand for 200 hours at 90° C. in a thermo-hygrostat (Model PL-3FP manufactured by TABAI ESPEC COP.) set at a relative humidity of 95%, and then left to stand for 24 hours at 23° C. in a constant temperature and humidity room of 50% in relative humidity, and subsequently the electrical characteristic (dielectric loss tangent) of this test piece was measured at frequencies of 100 hertz (Hz) and 1 megahertz (MHz).

(3) Izod impact strength (IZOD):

This was measured in accordance with ASTM D-256.

(4) Deflection temperature under load (DTUL):

This was measured in accordance with ASTM D-648.

(5) Deposition on mold:

Degree of deposition of the flame-retardant on the mold during injection molding was judged by the degree of clouding of the mold surface due to the short shot when a test piece for testing of physical properties was molded. When substantially no clouding occurred, this is indicated by "○", when slight clouding occurred, this is indicated by "Δ", and when heavy clouding occurred, this is indicated by "X".

Examples 1–6 and Comparative Examples 1–5

The components were mixed at the ratio as shown in Table 1, and the mixture was fed to a twin-screw extruder of 25 mm in screw diameter with a setting of the maximum temperature of the heating cylinder at 320° C. and melt kneaded at a screw revolution speed of 300 rpm, followed by cooling and cutting the strands to obtain pellets of the resin composition. Then, the resulting pellets of resin composition were injection molded at 240–290° C. to prepare a test piece for testing of physical properties, which was subjected to physical property tests by the above-mentioned test methods to obtain the results as shown in Table 1. No dropping of materials during burning was seen in any of the Examples and Comparative Examples.

TABLE 1

|  | Example | | | | | | Comparative Example | | | | |
|---|---|---|---|---|---|---|---|---|---|---|---|
|  | 1 | 2 | 3 | 4 | 5 | 6 | 1 | 2 | 3 | 4 | 5 |
| PPE (part by weight) | 40 | 40 | 40 | 70 | 40 | 40 | 40 | 40 | 40 | 40 | 40 |
| HIPS (part by weight) | 35 | 35 | 39 | 21 | 39 | 39 | 35 | 39 | 39 | 39 | 39 |
| Phosphazene compound (part by weight) |  |  |  |  |  |  |  |  |  |  |  |
| Preparation Example 1-1 (acid value: 0.01) | 15 |  |  |  |  |  |  |  |  |  |  |
| Preparation Example 1-2 (acid value: 0.3) |  | 15 |  |  |  |  |  |  |  |  |  |
| Preparation Example 2 (acid value: 0.02) |  |  | 11 | 9 |  |  |  |  |  |  |  |
| Preparation Example 3 (acid value: 0.01) |  |  |  |  | 11 |  |  |  |  |  |  |
| Preparation Example 4 (acid value: 0.01) |  |  |  |  |  | 11 |  |  |  |  |  |
| Reference Example 1 (acid value: 0.77) |  |  |  |  |  |  | 15 |  |  |  |  |
| Reference Example 2 (acid value: 0.55) |  |  |  |  |  |  |  | 11 |  |  |  |
| Reference Example 3 (acid value: 0.56) |  |  |  |  |  |  |  |  | 11 |  |  |

TABLE 1-continued

|  | Example | | | | | | Comparative Example | | | | |
| --- | --- | --- | --- | --- | --- | --- | --- | --- | --- | --- | --- |
|  | 1 | 2 | 3 | 4 | 5 | 6 | 1 | 2 | 3 | 4 | 5 |
| Phosphoric acid ester flame-retardant (part by weight) | | | | | | | | | | | |
| TPP (acid value: 0.03) | | | | | | | | | | 11 | |
| BPA-DPP (acid value: 0.6) | | | | | | | | | | | 11 |
| Physical properties | | | | | | | | | | | |
| Flame retardancy Total buring time in seconds | 40 | 47 | 48 | 37 | 46 | 44 | 78 | 89 | 78 | 58 | 82 |
| Electrical characteristics | | | | | | | | | | | |
| Dielectric loss tangent (100 Hz) | 0.0011 | 0.0017 | 0.0010 | — | — | — | 0.0042 | 0.0038 | — | 0.0046 | 0.0041 |
| Dielectric loss tangent (1 MHz) | 0.0014 | 0.0021 | 0.0012 | — | — | — | 0.0048 | 0.0030 | — | 0.0058 | 0.0031 |
| IZOD (Kg · cm/cm) | 11 | 10 | 12 | 13 | 12 | 13 | 10 | 12 | 11 | 13 | 10 |
| DTUL (° C.) | 98 | 98 | 105 | 141 | 108 | 107 | 97 | 105 | 107 | 83 | 96 |
| Deposition onto mold | ○ | ○ | ○ | ○ | ○ | ○ | Δ | Δ | Δ | X | Δ |

Industrial Applicability

The present invention provides a resin composition which contains no halogen-containing compounds, is excellent in electrical characteristics, heat resistance and mechanical properties, causes substantially no problems such as occurrence of smoke during injection molding and deposition of flame-retardants on the mold, is desirable for environmental health, and has high flame retardancy.

What is claimed is:

1. A resin composition which contains (A) a resin composition comprising a polyphenylene ether resin or a polyphenylene ether resin and a polystyrene resin and (B) a phosphazene compound having an acid value of less than 0.5.

2. A resin composition according to claim 1, wherein the acid value of the phosphazene compound is less than 0.3.

3. A resin composition according to claim 1 or 2, wherein the phosphazene compound is a phenoxyphosphazene compound.

4. A resin composition according to claim 1 or 2, wherein the phosphazene compound has a cyclic structure.

5. A resin composition according to claim 1 or 2, wherein the phosphazene compound is a phenoxyphosphazene compound having a crosslinked structure.

* * * * *